United States Patent
Sabato

(10) Patent No.: US 10,429,834 B2
(45) Date of Patent: Oct. 1, 2019

(54) CONTROL INTERFACE FOR UXV

(71) Applicant: ISRAEL AEROSPACE INDUSTRIES LTD., Lod (IL)

(72) Inventor: Moshe Sabato, Yishuv Hashmonayim (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 146 days.

(21) Appl. No.: 15/557,985

(22) PCT Filed: Apr. 3, 2016

(86) PCT No.: PCT/IL2016/050358
§ 371 (c)(1),
(2) Date: Sep. 13, 2017

(87) PCT Pub. No.: WO2016/166745
PCT Pub. Date: Oct. 20, 2016

(65) Prior Publication Data
US 2018/0046178 A1 Feb. 15, 2018

(30) Foreign Application Priority Data
Apr. 16, 2015 (IL) .......................................... 238318

(51) Int. Cl.
| *G05D 1/00* | (2006.01) |
| *G06F 3/00* | (2006.01) |
| *G06K 9/00* | (2006.01) |
| *B64C 39/00* | (2006.01) |

(Continued)

(52) U.S. Cl.
CPC .......... *G05D 1/0016* (2013.01); *G05D 1/0038* (2013.01); *G05D 1/0088* (2013.01); *G05D 1/0094* (2013.01); *G06F 3/04815* (2013.01); *G06F 3/04817* (2013.01); *G06K 9/0063* (2013.01); *B64C 39/024* (2013.01); *B64C 2201/127* (2013.01)

(58) Field of Classification Search
CPC ...... G05D 1/00; G05D 1/0016; G05D 1/0038; G05D 1/0088; G05D 1/0094; G06F 3/00; G06F 3/04817; G06K 9/00; G06K 9/0063; B64C 39/00; B64C 39/024; B64C 2201/127
See application file for complete search history.

(56) References Cited

U.S. PATENT DOCUMENTS

| 5,521,817 A * | 5/1996 | Burdoin | ............... G05D 1/0027 244/190 |
| 6,584,382 B2 | 6/2003 | Karem | |
| 6,925,382 B2 | 8/2005 | Lahn | |

(Continued)

OTHER PUBLICATIONS

"OnPoint Targeting V1.3—Vision Based", Procerus Technologies, Lockheed Martin, Nov. 18, 2008.
(Continued)

*Primary Examiner* — Yonel Beaulieu
(74) *Attorney, Agent, or Firm* — Dorsey & Whitney LLP

(57) ABSTRACT

The presently disclosed subject matter includes a system and a graphical user interface configured to enable an Ux V operator (e.g. an APCS operator) to direct the Ux V to view a selected object from a desired viewing angle, notwithstanding the fact that the desired viewing angle of the object is not exposed in a displayed image.

19 Claims, 5 Drawing Sheets

(51) Int. Cl.
*G06F 3/0481* (2013.01)
*B64C 39/02* (2006.01)

(56) References Cited

U.S. PATENT DOCUMENTS

| | | | | |
|---|---|---|---|---|
| 7,546,187 | B2 * | 6/2009 | Bodin | G05D 1/0094 |
| | | | | 701/26 |
| 7,911,497 | B2 | 3/2011 | Russell et al. | |
| 8,086,351 | B2 * | 12/2011 | Gaudiano | G05D 1/104 |
| | | | | 700/245 |
| 8,718,838 | B2 | 5/2014 | Kokkeby et al. | |
| 8,744,647 | B2 | 6/2014 | Paulsen et al. | |
| 8,903,568 | B1 | 12/2014 | Wang et al. | |
| 8,958,928 | B2 | 2/2015 | Seydoux et al. | |
| 10,146,892 | B2 * | 12/2018 | Tofte | G06Q 40/08 |
| 2002/0165649 | A1 * | 11/2002 | Wilhelm Rekow | A01B 69/008 |
| | | | | 701/26 |
| 2004/0193334 | A1 * | 9/2004 | Carlsson | G05D 1/0022 |
| | | | | 701/9 |
| 2005/0165516 | A1 * | 7/2005 | Haissig | G08G 5/0008 |
| | | | | 701/4 |
| 2006/0004723 | A1 * | 1/2006 | Fujiwara | G10L 19/167 |
| 2008/0144884 | A1 | 6/2008 | Habibi | |
| 2010/0110074 | A1 | 5/2010 | Pershing | |
| 2010/0228406 | A1 | 9/2010 | Hamke et al. | |
| 2010/0305778 | A1 | 12/2010 | Dorneich et al. | |
| 2013/0176423 | A1 | 7/2013 | Rischmuller | |
| 2013/0317667 | A1 | 11/2013 | Kruglick | |
| 2014/0192193 | A1 | 7/2014 | Zufferey et al. | |

OTHER PUBLICATIONS

"AutoFlight—Rotrob—unmanned helicopter systems" website: http://www.rotrob.com/index.php/AutoFlight/articles/AutoFlight.html Mar. 27, 2012.

Do Nascimento, I., Moriera Hemerly, E., "A Practical UAV Camera Based Piloting System", Instituto Tecnológico de Aeronáutica—Departamento de Sistemas e Controle, Sao-Paulo. Presented in the 20th International Congress of Mechanical Engineering, Nov. 15-20, 2009.

* cited by examiner

CONTROL INTERFACE FOR UXV

RELATED FIELD

The presently disclosed subject matter relates to control systems for controlling unmanned vehicles.

BACKGROUND

Unmanned vehicles (UxVs), which are predominantly used for military and special operation applications, are today becoming increasingly popular in civilian applications. UxVs are used in a large variety of applications including, for example, traffic monitoring, remote sensing and reconnaissance, transportation, search and rescue, domestic policing, electronic warfare and decoys, and more.

Unmanned vehicles include various types, such as for example Unmanned Aerial Vehicles (UAVs also known as Unmanned Aerial systems), Unmanned Ground Vehicles (UGVs), Unmanned Marine Vehicles (UMVs), etc.

The operation of a UxV throughout its mission is controlled by a control station which is manned by a control station operator. For example, a UAV is controlled and monitored from takeoff, through flight and mission performance, and until landing.

GENERAL DESCRIPTION

According to an aspect of the presently disclosed subject matter there is provided a surveillance system comprising: a UxV control unit configured to communicate over a communication link with a UxV; the UxV comprising a sensing unit configured to capture one or more images of a surveyed area and transmit the images to the UxV control unit; the UxV control unit is configured to display the one or more images on a display device;

the UxV control unit is further configured, responsive to received data indicative of a selected object in the one or more images, to assign a graphical control icon to the selected object; the graphical control icon being a 3D representation of the selected object, wherein different faces of the selected object are assigned to different respective faces of the graphical control icon;

the graphical control icon is capable of being manipulated by an operator for changing its orientation and thus exposing, towards the operator, faces of the control icon which represent faces of the selected object that are not exposed in the displayed image and which enable the operator to interact with the graphical control icon for inputting pointing instructions for directing the UxV to view the selected object at desired viewing angles;

the surveillance system is configured, responsive to pointing instructions comprising data indicative of desired viewing angles of the selected object, to:

determine whether viewing the selected object at desired viewing angles requires repositioning of the UxV, and if so, to generate instructions for repositioning the UxV to enable the sensing unit to view the object at the desired viewing angles.

According to certain examples of the presently disclosed subject matter the system may comprise the additional features (i-ix) enumerated below in any technically possible combination and/or permutation:

i. The system further comprises the UxV; the UxV comprising an onboard control unit configured to perform said determining whether viewing the selected object at desired viewing angles requires repositioning of the UxV and said generating.

ii. wherein the control unit is configured to perform said determining whether viewing the selected object at desired viewing angles requires repositioning of the UxV.

iii. wherein the control unit is configured, responsive to received data indicative of a selected object in the one or more images, to display the graphical control icon over the selected object in the one or more images.

iv. wherein the control unit is configured, responsive to received data indicative of a selected object in the one or more images, to display the graphical control icon not directly on the selected object.

v. wherein the control unit is configured, responsive to received data indicative of a selected object in the one or more images, to generate the graphical control icon according to the shape and size of the selected object.

vi. wherein the graphical control icon is a selectable and resizable icon which can be adapted to the shape and size of the selected object.

vii. wherein the control unit comprises a drawing tool configured for enabling the operator to draw the graphical control icon around the selected object.

viii. wherein the one or more images are a succession of images in a video streaming; the surveillance system is further configured to trace graphical control icons from an earlier image to a later image along the succession of images, thereby maintaining each graphical control icon associated with its assigned object along the succession of images in the video stream.

ix. wherein the UxV is an unmanned aerial vehicle.

According to another aspect of the presently disclosed subject matter there is provided a computerized method of controlling a UxV in a surveillance system; the surveillance system comprises a UxV control unit configured to communicate over a communication link with the UxV; the UxV comprises a sensing unit configured to capture one or more images of a surveyed area and transmit the images to the UxV control unit; the UxV control unit is configured to display the one or more images on a display device;

the method comprising:

responsive to data received at the control system, indicative of a selected object in the one or more images, assigning a graphical control icon to the selected object; the graphical control icon being a 3D representation of the selected object, wherein different faces of the selected object are assigned to different respective faces of the graphical control icon;

the graphical control icon is capable of being manipulated by an operator for changing its orientation and thus exposing, towards the operator, faces of the control icon which represent faces of the selected object that are not exposed in the displayed image and which enable the operator to interact with the graphical control icon for inputting pointing instructions for directing the UxV to view the selected object at desired viewing angles;

responsive to received pointing instructions comprising data indicative of desired viewing angles of the selected object, determining whether viewing the selected object at the desired viewing angles requires repositioning of the UxV: and if so, generating instructions for repositioning the UxV to enable the sensing unit to view the object at the desired viewing angles.

According to certain examples of the presently disclosed subject matter the method may comprise the additional features (i-ix) enumerated above in any technically possible combination and/or permutation.

According to another aspect of the presently disclosed subject matter there is provided a computer-readable non-transitory memory device tangibly embodying a program of instructions executable by the computer operatively connected to a surveillance system for executing a method of controlling a UxV; the surveillance system comprising a UxV control unit configured to communicate over a communication link with the UxV; the UxV comprising a sensing unit configured to capture one or more images of a surveyed area and transmit the images to the UxV control unit; the UxV control unit is configured to display the one or more images on a display device;

the program of instructions comprising:

responsive to data received at the control system, indicative of a selected object in the one or more images, assigning a graphical control icon to the selected object; the graphical control icon being a 3D representation of the selected object, wherein different faces of the selected object are assigned to different respective faces of the graphical control icon;

the graphical control icon is capable of being manipulated by the operator for changing its orientation and thus exposing, towards the operator, faces of the control icon which represent faces of the selected object that are not exposed in the displayed image and which enable the operator to interact with the graphical control icon for inputting pointing instructions for directing the UxV to view the selected object at desired viewing angles;

responsive to received pointing instructions comprising data indicative of desired viewing angles of the selected object, determining whether viewing the selected object at the desired viewing angles requires repositioning of the UxV and if so, generating instructions for repositioning the UxV to enable the sensing unit to view the object at the desired viewing angles.

According to certain examples of the presently disclosed subject matter the memory-device may comprise the additional features (i-ix) enumerated above in any technically possible combination and/or permutation:

According to yet another aspect of the presently disclosed subject matter there is provided a UxV control unit configured to communicate over a communication link with a UxV; the UxV comprising a sensing unit configured to capture one or more images of a surveyed area and transmit the images to the UxV control unit; the UxV control unit is configured to display the one or more images on a display device;

the UxV control unit is further configured, responsive to received data indicative of a selected object in the one or more images, to assign a graphical control icon to the selected object; the graphical control icon being a 3D representation of the selected object, wherein different faces of the selected object are assigned to different respective faces of the graphical control icon;

the graphical control icon is capable of being manipulated by an operator for changing its orientation and thus exposing, towards the operator, faces of the control icon which represent faces of the selected object that are not exposed in the displayed image and enabling the operator to interact with the graphical control icon for inputting pointing instructions for directing the UxV to view the selected object at desired viewing angles;

the UxV control unit or a control unit onboard the UxV is configured, responsive to pointing instructions comprising data indicative of desired viewing angles of the selected object, to:

determine whether viewing the selected object at the desired viewing angles requires repositioning of the UxV and if so, to generate instructions for repositioning the UxV to enable the sensing unit to view the object at the desired viewing angles.

According to certain examples of the presently disclosed subject matter the UxV control unit may comprise the additional features (i-ix) enumerated above in any technically possible combination and/or permutation.

BRIEF DESCRIPTION OF THE DRAWINGS

In order to understand the claimed subject matter and to see how it may be carried out in practice, various embodiments will now be described, by way of non-limiting example only, with reference to the accompanying drawings, in which:

DETAILED DESCRIPTION

Unless specifically stated otherwise, as apparent from the following discussions, it is appreciated that throughout the specification discussions utilizing terms such as "assigning", "changing", "determining", "generating", or the like, include actions and/or processes of a computerized device that manipulate and/or transform data into other data, said data represented as physical quantities, e.g. such as electronic quantities, and/or said data representing physical objects.

The terms "computer", "computerized device", or any other variation thereof should be expansively construed to cover any kind of electronic device with data processing capabilities, such as a processor (e.g. digital signal processor (DSP), microcontroller, field programmable circuit (ASIC), etc) or a device which comprises or is operatively connected to one or more computer processors including by way of non-limiting example, a personal computer, server, laptop computer, computing system, a communication device and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the claimed subject matter, which are, for clarity, described in the context of separate embodiments, may also be provided in combination in a single embodiment. Conversely, various features of the invention, which are, for brevity, described in the context of a single embodiment, may also be provided separately or in any suitable sub-combination. While the invention has been shown and described with respect to particular embodiments, it is not thus limited. Numerous modifications, changes and improvements within the scope of the claimed subject matter will now occur to the reader.

Figure 1:
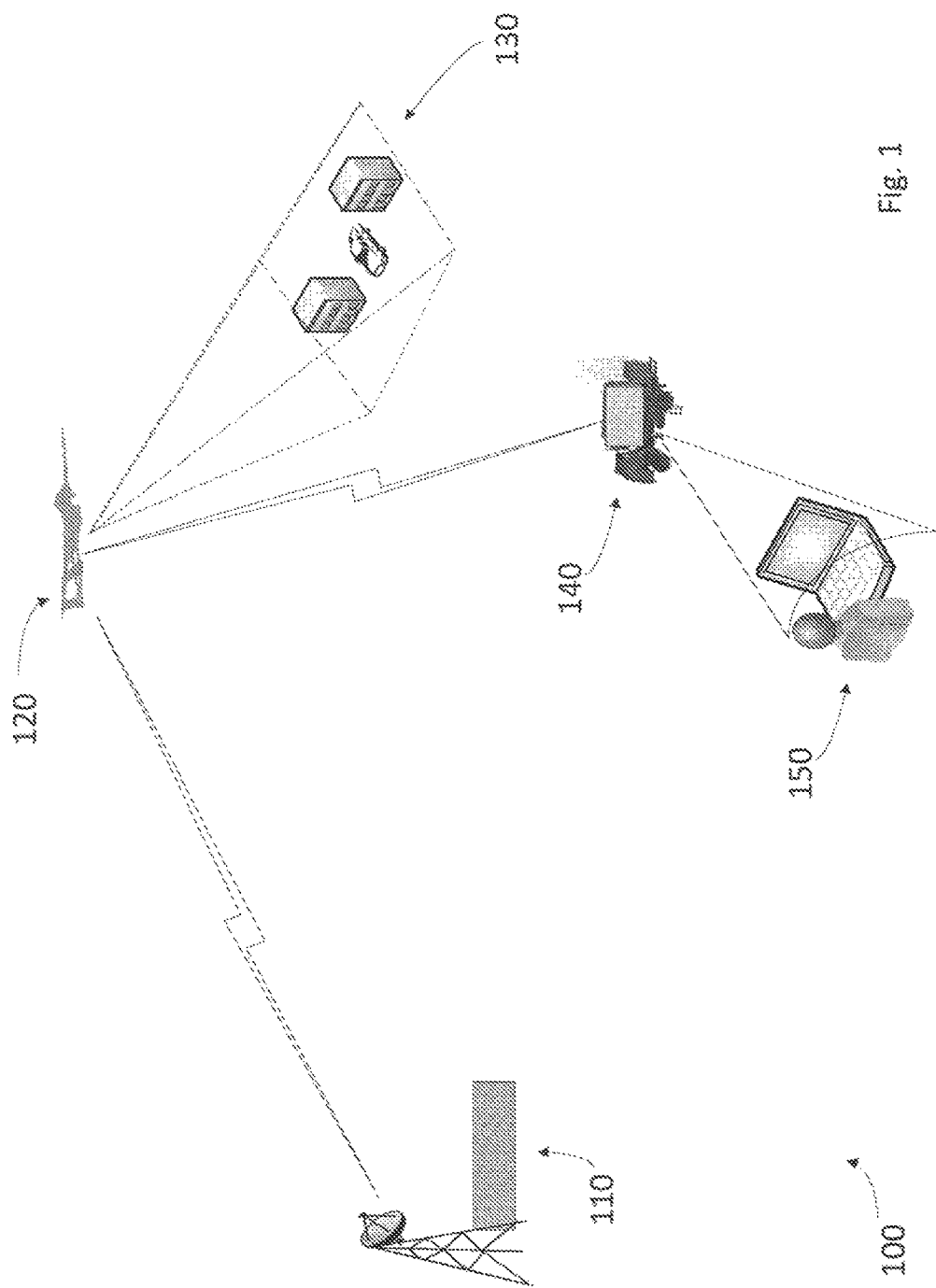
FIG. 1 is a schematic illustration of a UAV-based surveillance system, according to an example of the presently disclosed subject matter.
Figure 4:
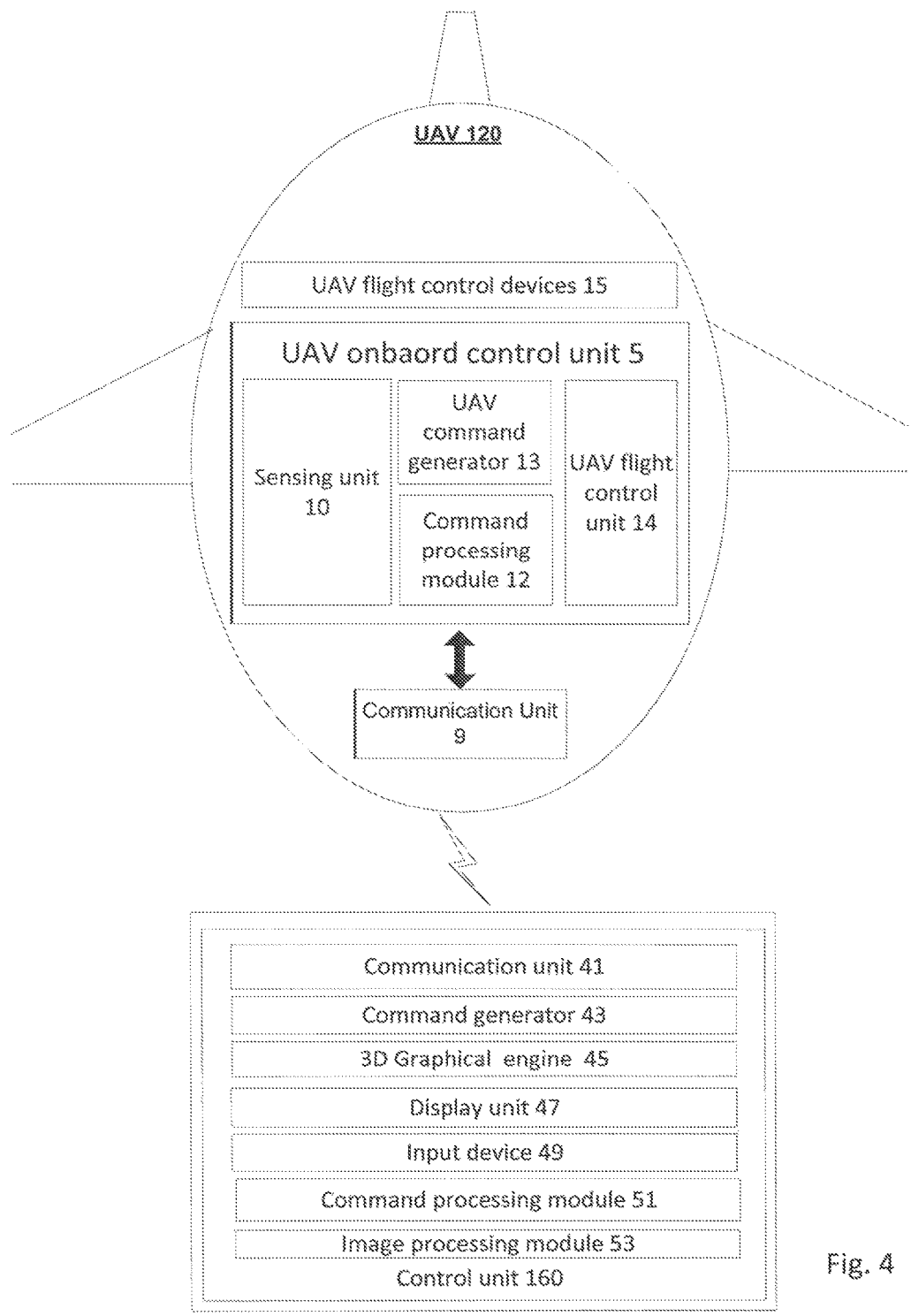
FIG. 4 is a functional block diagram of a UAV operatively connected to a remote control system, according to an example of the presently disclosed subject matter.
Figure 5:
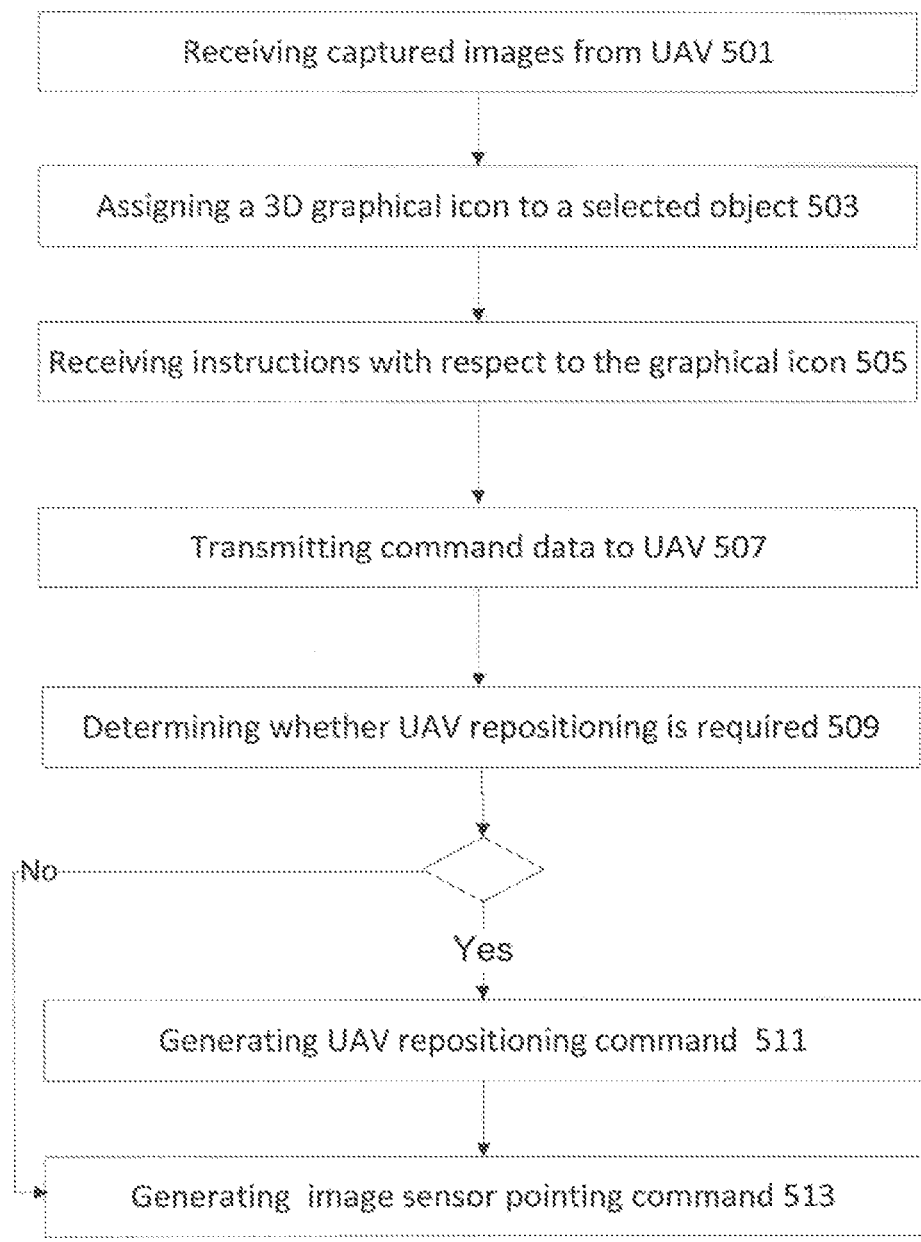
FIG. 5 is a flowchart of a sequence of operations according to an example of the presently disclosed subject matter.

In embodiments of the claimed subject matter, fewer, more and/or different stages than those shown in FIG. 5 may be executed. In embodiments of the claimed subject matter one or more stages illustrated in FIG. 5 may be executed in a different order and/or one or more groups of stages may be executed simultaneously. FIG. 1 and FIG. 4 illustrate a schematic of the system architecture in accordance with embodiments of the presently disclosed subject matter. Functional elements in FIG. 1 and FIG. 4 may be centralized in one location or dispersed over more than one location. In other embodiments of the presently disclosed subject matter, the system may comprise fewer, more and/or different functional elements than those shown in FIG. 1 and FIG. 4.

UxV onboard control unit 5 as well as control unit 160 depicted in FIG. 4 are each a computerized device comprising or otherwise associated with one or more computer processor devices and computer memory (comprising the required computer instructions) for providing the required processing capability and executing the operations as disclosed herein.

The terms "image" and "images" should be expansively construed to cover both stills images as well as images combined into a video stream.

The term "object" as used herein should be broadly interpreted to include any type of identifiable object in an image of a scene or part thereof, including a specific type of object in an image of a scene (e.g. car, building, person, aircraft etc.) as well as a discernible group of one or more pixels (e.g. a group of moving pixels or a group of pixels characterized by a discernible temperature or color with respect to their surrounding area) or an area selected in an image of the surveyed scene.

Bearing the above in mind, attention is now drawn to FIG. 1 showing a schematic illustration of a surveillance system, according to an example of the presently disclosed subject matter. The illustration in FIG. 1 provides an example of a high level view of a UAV-based surveillance and tracking system 100. It is noted that while the description set forth herein mainly pertains to UAVs, this is done by way of a non-limiting example only and the principles disclosed with respect to UAVs can be similarly implemented in other types of unmanned vehicles (UxVs).

In general, a UxV system for surveillance and remote tracking of objects (herein termed surveillance system) comprises a control system 110 (sometimes known as ground control unit (GCU)) at one location and a UxV 120 (exemplified in FIG. 1 by an UAV) carrying a sensing unit at another location. The control unit is configured to enable an operator to monitor and control the operation of a respective UxV. Control of the UxV can include both control over the operation of the UAV itself, as well as control over the operation of various payloads which are installed on the UAV. Control system 110 can communicate with UxV 120 over a line of sight (LOS) and/or beyond line of sight (BLOS) communication link.

The sensing unit, which comprises some type of data acquisition payload (e.g. image sensor or Radar) can be used for surveying a scene (area of interest 130) and transmitting sensing-data to the control unit. Sensing-data includes data that was acquired by the data acquisition payload or data generated using the acquired data (e.g. captured images of the surveyed area of interest (AOI), data characterizing identified objects in the captured images etc.). Captured images can be provided by a sensing unit in the form of stills images and/or video stream. Sensing-data received at control system 110, can be displayed on a display device for viewing by control system 110 operators.

The sensing unit can be further configured to locate and track a sighted object. The control unit allows providing the sensing unit with control-data, including for example, different types of commands, each command comprises instructions for directing the sensing unit to perform various operations. Commands include for example, lock and track commands, zoom commands, centering commands, etc. The sensing unit is configured to execute the received command and provide the control unit with the requested sensing-data.

According to the requirements of STANAG 4586 which is the NATO specification for implementing a core UAV control system (CUCS, comprising both ground and aerial UAV control components) control system 110 comprises a client module (operator console) connected in sequence to the application servers unit, vehicle specific module and primary B\LOS ground data terminal.

The operator console can be implemented on various types of computerized devices including by way of non-limiting example, PC or laptop computers or any other computerized device which comprises computer memory (e.g. volatile and non-volatile) and one or more computer processors configured with the required processing capabilities and dedicated software. The operator console is used by an operator to control the UAV while on the ground and in the air.

The application servers unit comprises one or more computerized devices (e.g. computer servers) configured to enable the execution of various tasks. Each server is a computerized device with appropriate computer memory and one or more computer processors providing the required data processing capabilities.

The application servers unit can include by way of non-limiting example: flight control server configured for controlling the UAV's flight; various data acquisition servers operatively connected to a respective data acquisition device (e.g. camera, radar, communication intelligence device, etc.) installed on the UAV.

B/LOS GDT is configured to communicate with the UAV via a respective aerial data terminal (B/LOS ADT) which is part of the UAV onboard control system. Communication between GDT and ADT can be line of sight communication (LOS) or satellite based, beyond line of sight communication (B-LOS).

As illustrated in FIG. 1, in addition to control system 110 UAV 120 also communicates with one or more active payload control systems (APCS) 140. APCS is a system which enables to provide sensing-data directly from the UAV to various entities other than control system 110. For example, task forces deployed in a mission area often make use of UAV sensing-data during mission execution. Likewise, commanding forces engaged in a mission, possibly located outside the mission area, may also use UAV sensing-data for controlling the mission and commanding other forces participating in the mission. Similar to control system 110, APCS 140 comprises a LOS and/or BLOS communication link with the UAV and an operator console allowing an operator to view sensing-data transmitted from the UAV, which is displayed on a respective display device.

FIG. 1 shows an example of a vehicle based APCS 140 with an operator console 150 installed within the vehicle. Other types of APCS 140 also exist including more compact versions which are not vehicle based and comprise for example a portable computerized device configured for communicating with UAV 120. Some APCS portable devices can be carried by task force personnel allowing mobile forces to view UAV sensing-data received directly from the UAV in real-time. Similar to the control unit operator console, the APCS operator console can be implemented on various types of computerized devices including by way of non-limiting example, PC or laptop computers or any other computerized device which comprises computer memory (e.g. transitory and non-transitory) and one or more computer processors configured with the required processing capabilities and dedicated software.

Notwithstanding its benefits, APCS 140 does not provide all the functionalities provided by control system 110. For example, unlike control system 110, APCS 140 does not include UAV flight controls, and accordingly an APCS operator is unable to send direct flight control instructions to the UAV. Thus, in the event that an APCS 140 operator wishes to reposition the UAV, he is required to contact an operator of control system 110 over a communication link and provide the control unit operator with the desired UAV position. The control unit operator can then use the UAV controls available at control system 110, and direct the UAV to the desired location.

In some cases, during surveillance or tracking missions, while imaging data of a surveyed scene is being transmitted to APCS 140, an APCS operator may wish to change the viewing angle of the sensing unit. To that end the APCS operator may send pointing commands (comprising pointing instructions) to the UAV directed for controlling the angle of an imaging device (e.g. camera) for providing images at the desired angle. These types of control commands can be generated with the help of some type of control device allowing the APCS operator to input the relevant control commands. For example, some operator consoles allow APCS operators to point with a pointing device (e.g. computer mouse, dedicated joystick, touch screen, etc.) on a desired object of interest or area in the displayed images, and generate commands to the UAV to point the imaging device to the desired location.

Figure 2:
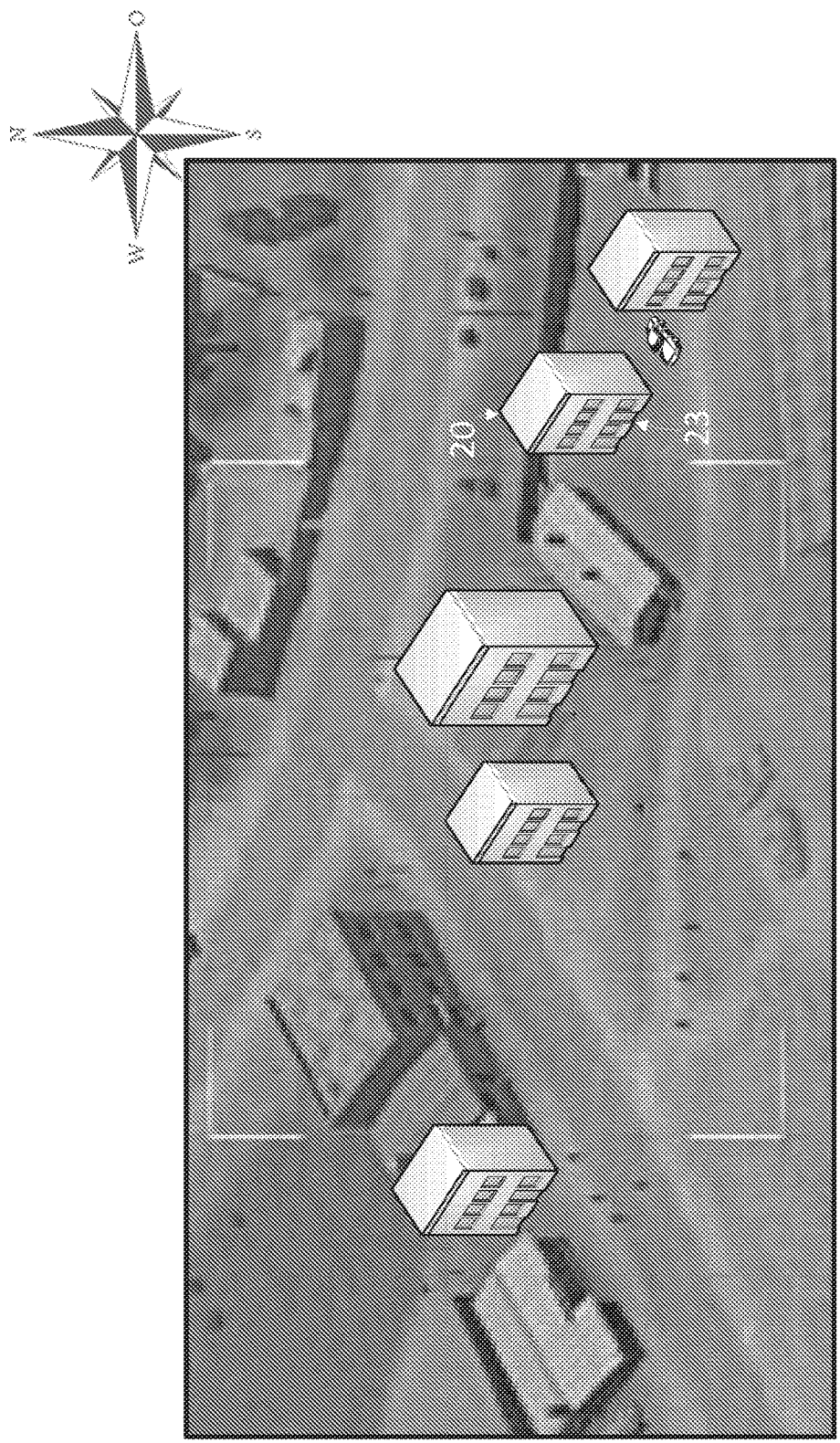
FIG. 2 is a schematic illustration of a displayed image, according to an example of the presently disclosed subject matter.

However, in some cases an APCS operator may wish to view an object or an area which is not visible on the displayed images. For example, consider image 200 shown in FIG. 2 comprising building 20. The front side of the building (marked by 23) is exposed in the displayed image allowing an APCS operator to point with an input device (e.g. mouse cursor) at any point located on the front side of the building (facing substantially the south-west direction). The APCS operator can thus direct the imaging device to point and/or zoom anywhere in the front side of the building.

If, however, the APCS operator wishes to view the rear of the building (facing substantially the north-east direction) he is unable to do so, since the rear of the building is not exposed in the image and therefore the APCS operator is unable to point to the desired area. Thus, as explained above, the APCS operator is required to contact control system 110 operator and request the operator to reposition the UAV to allow viewing the building from the desired direction. Clearly this process is inconvenient, time consuming and depends on the existence of an available communication link between control system 110 and APCS 140.

Thus, according to the presently disclosed subject matter, there is provided an APCS graphical user interface. The graphical user interface disclosed herein is configured to enable an UxV operator (e.g. an APCS operator) to direct the UxV to view a selected object from a desired viewing angle, notwithstanding the fact that the desired viewing angle of the object is not exposed in the displayed image. The graphical user interface is thus configured to operate in a "slave to icon" mode rather than the commonly known "slave to sensor mode".

While the proposed solution can be used in any type of UxV control unit, for the sake of simplicity it is described below in the context of an APCS where it provides a solution to the aforementioned problem of directing a UxV to view an object from desired viewing angles. However, it is noted that this should not be construed as limiting in any way.

According to the presently disclosed subject there is provided a graphical user interface configured with a 3 dimensional (3D) graphical control tool. The 3D graphical control tool allows an APCS operator to place a graphical control icon in a desired position in a displayed image over a selected object, and use the icon for indicating, directly to the UxV, a desired viewing angle of the selected object.

Figure 3:
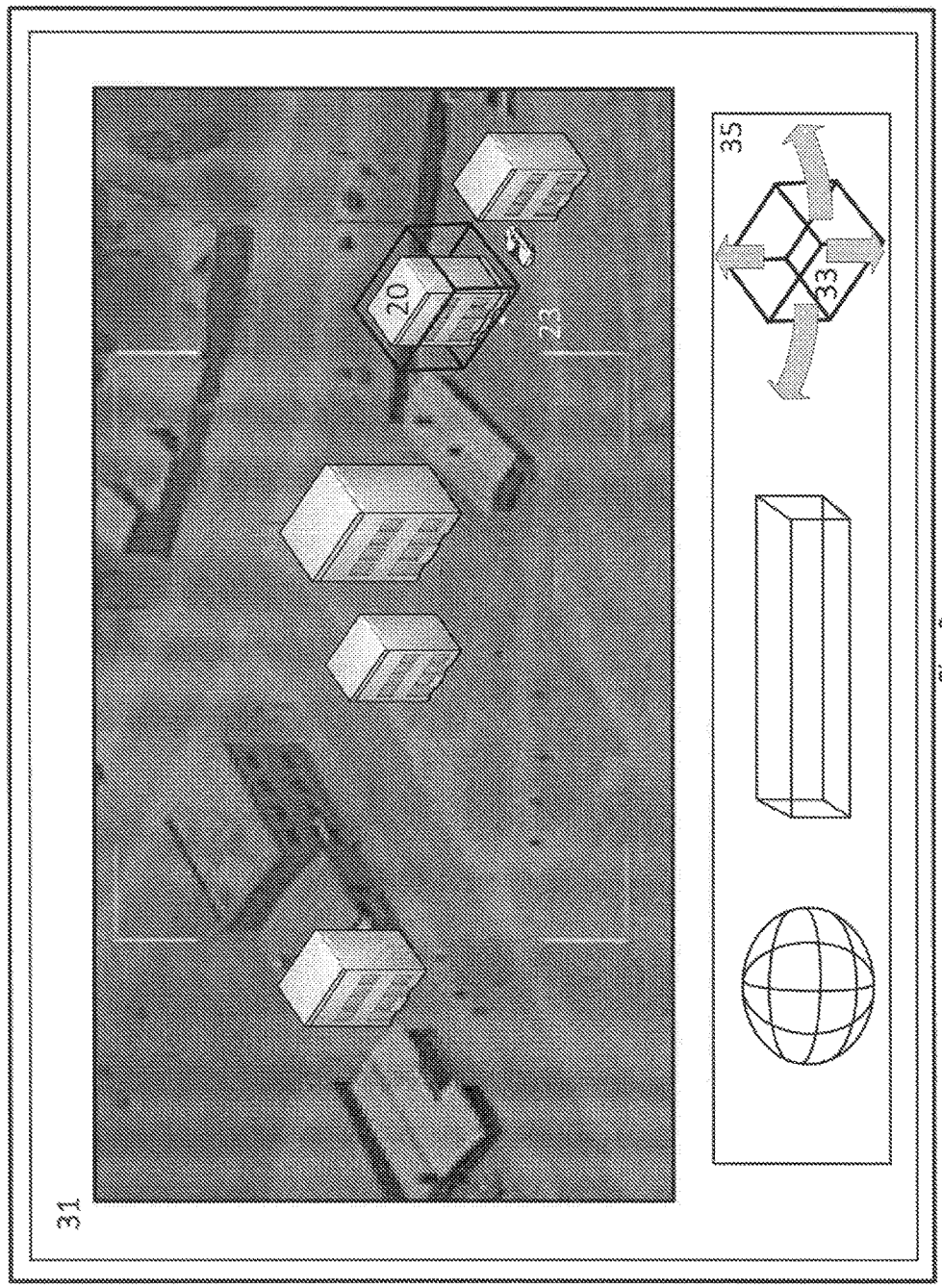
FIG. 3 is a schematic illustration of a graphical user interface and display, according to an example of the presently disclosed subject matter.

FIG. 3 is a schematic illustration demonstrating an APCS operator console with a graphical user interface according to an example of the presently disclosed subject matter. FIG. 3 shows screen 31 of an operator console of APCS 140 displaying images captured by UAV 120. The displayed image shows the same screenshot shown earlier in FIG. 2.

FIG. 3 also shows graphical control icon 33 of the 3D graphical control tool disclosed herein, which is displayed on screen 31. Graphical control icon can be displayed for example, in a toolbar control element 35. The toolbar can be integrated into the edge of screen 31 or a display window. The graphical control icon can be otherwise displayed in any way known in the art.

Graphical control icon 33 can be configured as a 3D geometrical shape (e.g. polyhedron) which can be used by an APCS operator to mark an object of interest in a displayed image. For example, graphical control icon 33 can be dragged from its location in the toolbar control element to the screen and be placed over the object of interest, appearing as an external skeleton surrounding the object. The graphical control icon can be configured with resizable dimensions, which can be stretched or compressed to fit the size and shape of the selected object of interest. Optionally, multiple icons having different selectable shapes and proportions can be made available (e.g. displayed on the toolbar) allowing the operator to conveniently select the most suitable icon for a given selected object. According to an example, some icons can be pre-configured with the shapes of certain common objects which are likely to be selected in viewed images. For example, a vehicle shaped icon can be provided for tracking vehicles. According to another example, graphical control icon 33 can be drawn by APCS operator (e.g. with the help of a dedicated drawing tool) on top of the displayed image at the desired location.

Once the graphical control icon is placed in the correct position (and optionally after position of the icon in the image is confirmed by the operator) each face of the 3D graphical control icon assumes the representation of a respective real world face (or side) of the object as displayed in the image(s).

The APCS operator can now interact with the graphical control icon for providing pointing instructions to the UxV, rather than interacting directly with the object in the displayed image. For example, pointing instructions can be generated by the APCS operator by pointing to a desired point on graphical control icon 33. Responsive to a pointing instruction generated with respect to the graphical control icon, a pointing command is generated with respect to the corresponding point on the object.

The graphical control icon enables the APCS operator to generate pointing instructions for directing the UAV to observe any face of the selected object, including those not exposed in the displayed image. Once it is placed in a displayed image, graphical control icon 33 can be manipulated by the APCS operator to change its orientation. According to one example, the control icon which is placed in the image can be manipulated by the operator to change its orientation in all directions and thus expose, towards the operator, the faces of the control icon which represent hidden faces of the object that are not exposed in the displayed image. For example, rotation around the center of the 3D graphical control icon 33 can be done by a left mouse button click followed by mouse dragging in the desired orientation and direction of rotation. This action exposes to the operator faces of the icon, representing the hidden faces of the respective object and allows the operator to interact and point to these faces. Optionally, in some cases, rotation of the graphical control icon may not be allowed in all directions. For example, a graphical control icon assigned to a building may not be allowed to be rotated such that the bottom of the building, being in contact with the ground, is exposed.

Alternatively or additionally, manipulation of the 3D graphical control icon can be done on a different icon than the one placed in the displayed image, such as a 3D graphical control icon located in the toolbar control element representing the icon placed in the displayed image. This solution allows maintaining the 3D graphical control icon in the image at the same orientation of the respective object while the toolbar icon is manipulated and turned in order to expose faces of the icon, representing the hidden faces of the respective object. According to yet another example, a 3D graphical control icon is not necessarily placed over the selected object. Rather, once an object of interest is selected in a displayed image (e.g. by mouse clicking or otherwise marking the object) a respective 3D graphical control icon placed at a different location (not directly on the selected object, e.g. on the toolbar control element) is activated for receiving instructions with respect to the selected object, while the object itself in the image remains unchanged.

FIG. 4 is a functional block diagram of a UAV operatively connected to a control unit, according to an example of the presently disclosed subject matter. Control unit 140 can be for example APCS. FIG. 4 shows UAV 120 comprising UAV onboard control unit 5, communication unit 9 and UAV flight control devices 15. UAV communication unit 9 is configured to provide a LOS and/or BLOS communication link with communication unit 41 of control unit 160. Communication between UAV 120 and the control unit can be realized by any suitable communication infrastructure and protocol known in the art. Communication unit 9 can comprise or be otherwise operatively connected to an aerial data terminal (B/LOS ADT) as described above.

UAV onboard control unit 5 comprises data acquisition payload (sensing unit 10). The sensing unit can include an imaging device (e.g. a camera) configured for capturing images of a surveyed scene. These images can come from an electro-optic sensor which can provide for example, color optical images, black and white optical images, as well as infra-red image sensor, or any other types of imaging devices.

UAV onboard control unit further comprises a command processing module 12 and a command generator module 13. Command processing module 12 is configured to receive control-data and generate instructions for executing respective commands. For example, control-data can include pointing instructions directed for pointing the image sensor in a desired direction.

If it is determined (e.g. by command processing module 12) that execution of a command requires the repositioning of the UAV, command processing unit 12 can generate and provide instructions to UAV flight control system 14 configured to control flight control devices for navigating the UAV to a desired position. Thus, command processing module 12 can be configured to determine whether the execution of a received pointing command requires repositioning of the UAV and if so, to generate instructions (e.g. with the help of command generator 13) to UAV flight control system 14 for controlling UAV flight control devices 15 in order to navigate the UAV to the desired location and provide the required images.

UAV flight control devices include for example throttle, stabilizers, ailerons and rudders, configured for directing the UAV from its current position to a new desired position. Obviously, in other types of UxVs different control devices exist depending on the specific type of vehicle. For example, in an Unmanned Ground Vehicle control devices may include steering, transmission, throttle and breaking mechanisms. UAV flight control system 14 may include various control units, each dedicated for controlling the operation of a respective flight control device.

Turning to control unit 160 (e.g. APCS 140), it comprises (in addition to communication unit 41) display unit 47, input device 49, command generator 43 and graphical engine 45.

Display unit 47 comprises one or more display devices (e.g. one or more LED screens) for displaying received sensing-data received from UAV 120. Input device 49 is configured to enable an operator to interact with the control unit. Input device 49 includes for example, keyboard, joystick, computer mouse, touch pad, touch screen or any other device enabling operator-interaction with the control system.

3D graphical engine 45 is configured to generate and display the 3D graphical control tool for controlling the UAV. Command generator 43 is configured to generate control-data responsive to instructions received by an operator. For example, an APCS operator may interact with the control unit for generating pointing instructions directed for pointing the sensing unit to provide desired viewing angles of a selected object. Command generator 43 is configured to generate a respective pointing command based on the received pointing instructions.

FIG. 5 is a flowchart of a sequence of operations carried out according to an example of the presently disclosed subject matter. Operations described with reference to FIG. 5, can be executed, for example, with the help of a surveillance system configured according to the principles described above with reference to FIG. 4. It is noted however that any description of operations which is made with reference to elements in FIG. 4 is done by way of example and for the purpose of illustration only and should not be construed as limiting in any way.

The sensing unit onboard an UxV (e.g. UAV 120) acquires images of a surveyed scene. Sensing-data comprising at least the captured images transmitted from the UxV is received at the control unit e.g. APCS 140 (block 501). The captured images may comprise one or more objects. For the purpose of providing a continuous video feed of the surveyed scene, images are continuously captured and continuously transmitted, and displayed at the control unit.

At block 503 one or more 3D graphical control icons are generated (e.g. with the help of 3D graphical engine 45) and displayed on the display device. Optionally, graphical control icons can be automatically generated by graphical engine 45 and displayed by display unit 47. For example, as mentioned above, graphical control icons can be generated and displayed in a toolbar control element, making the icon available for use. The operator can then drag an appropriate icon and place it on an object of interest selected in the displayed images (or otherwise associate between the graphical control icon and the selected object). Alternatively or additionally, graphical control icons can be generated in response to a request or specific operation of an operator. For example, APCS operator can use input device 49 for selecting an object of interest displayed in one or more images and thus cause graphical engine 45 to generate a 3D graphical control icon surrounding the selected object. To this end control unit 160 can comprise an image processing module configured to determine the shape and possibly also size of the selected object and provide the graphical engine with instructions for generating an appropriate graphical control icon.

According to another example, an APCS operator can use input device 49 (configured together with the graphical engine as a drawing tool) for marking the outlines of an object of interest displayed in one or more images, and thus cause graphical engine 45 to generate a 3D graphical control icon according to the outline of the object, as marked by the operator.

As explained above, once the graphical control icon is placed in the correct position (and optionally the position is confirmed by the operator) each face of the 3D graphical control icon assumes the representation of a respective real world face (or side) of the object as displayed in the image(s). Association between the faces of the object and the faces of the icon can be performed for example by graphical engine 45.

In video streaming, graphical control icons are traced from an earlier image to a later image along a succession of captured images, thereby maintaining each graphical control icon associated with its respective object along the succession of images in the video stream. Methods of tracing objects from an earlier image to a later image along a succession of images are well known in the art and include for example a video motion detection algorithm (which enables tracing moving objects), center of gravity identification, edge detection, correlation etc.

After an object of interest has been selected and a respective 3D graphical control icon has been assigned to the selected object (and in some cases also correctly placed over the selected object), the operator can interact with the icon for generating pointing instructions. At block 505 pointing instructions are received (e.g. from an operator) indicating desired viewing angles for viewing the selected object. The pointing instructions can be received by an operator using an input device for pointing on the 3D graphical control icon assigned to the selected object. Pointing instructions are processed by the control unit (e.g. with the help of command generator 43) and a respective command is generated and transmitted to the UxV (block 507). Notably, in some cases, responsive to selection of an object of interest, the control unit is initially configured to issue a centering command (e.g. with the help of command generator 43) instructing the UAV to position the selected object at the center of the displayed images.

The received (pointing) command is processed (e.g. with the help of command processing module 12) to, inter alia, determine whether the respective pointing instructions require repositioning of the UxV (block 509). The pointing location on the 3D graphical control icon is considered and compared to the current position of the UxV. UxV position can be obtained from an onboard positioning such as a GPS receiver and/or INS. In some cases, the dimensions (e.g. height) of the selected object can also be obtained from the viewed image and used for determining whether repositioning of the UxV is required. As mentioned above, the graphical control icon can be manipulated by the operator in order to change its orientation (e.g. by turning the icon around its central axis in various directions) and thus expose, for interaction, areas of the icons which represent respective areas of the assigned object of interest which are not visible to the sensing unit and are thus not exposed in the displayed images.

In the event pointing was made on a part of the 3D control icon, which represents a respective part of the selected object that is currently visible to the sensing unit 10 and is thus exposed in the displayed image, and it is determined that repositioning of the UxV is not required, only a pointing command is generated (block 513). The pointing command includes instructions for directing the image sensor to point in the desired direction. If an initial centering command has already brought the image sensor to point in the desired direction, no further commands are necessarily executed.

If, however, pointing was made on a part of the 3D control icon, which represents a respective part of the selected object that is currently not visible to the sensing unit 10, and is thus not exposed in the displayed image, a UAV repositioning command is generated (block 511). The repositioning command includes instructions for navigating the UAV to new position from which the desired point can be viewed by the image sensor.

Optionally, a pointing command can be generated in addition to the repositioning command for directing the sensing device towards a certain point. Alternatively, a pointing command (or a centering command) can be generated based on pointing instructions received from the operator after the UAV has reached its new position.

According to an alternative approach, processing of the command, for determining whether repositioning of the UxV is required, is performed by the control unit. To this end control unit 160 can comprise command processing module 51 configured to execute operations as described above with reference to blocks 509 to 513. After the processing is completed, the respective command can be transmitted to the UxV where it can be executed.

Received pointing commands are processed for generating instructions for directing the image sensor in a desired direction. Received UAV navigation (repositioning) commands are processed for generating instructions to the UAV fight control elements for navigating the UAV to a new position from which the desired point of view of the object can be obtained.

While the presently disclosed subject matter provides an APCS operator with the ability to generate instructions directed to repositioning a UxV, in surveillance systems such as the one illustrated above with reference to FIG. 1, the operator of control system 110 can be maintained in the loop for controlling the UxV. For example, the operator of control system 110 may have superseding commands over the APCS operator, and, accordingly may confirm or abort the APCS generated instructions before they are executed by the UxV.

In different flight scenarios, progression of a UxV is restricted by various restrictions. For example, a UAV flight is sometimes restricted by no-flight zones (NFZ), which are areas over which aircraft are not permitted to fly. Similarly, restricted airspace is an area (volume) of airspace in which air traffic is restricted. Such restrictions are commonly set up by authorities for military, security or safety reasons. For example, for national security reasons, aircraft are often allowed to cross borders between neighboring countries, only after being officially authorized to do so. In some cases, where the border delineates enemy territory, crossing of such a border may be altogether prohibited. Likewise, some aircraft (such as UAVs) are not allowed to fly over populated areas for human safety reasons.

Other flight restrictions are related to the topography and/or the land cover in urban areas. For example, flight routes can be restricted in the vicinity of tall mountains or buildings to avoid the risk of collision.

Another example of a flight restriction is related to the operation of an onboard camera. In order to maintain the camera continuously operative, it is imperative to keep an open line of sight between the camera and the object(s) of interest (e.g. in the direction of the ground). However, while turning, banking of the wings may position the UAV fuselage between the camera (located for example on the ventral side of the fuselage) and the direction of the earth, thus blocking the line of sight between the camera and the object(s) which are being captured. Note, that banking of the UAV directs the camera FOV away from the object of interest.

Likewise, the progression of a UGV can be restricted by the existence of holes, crevices or any other type of drops in the ground which may put the vehicle in danger.

According to some examples, during execution of the repositioning command, UAV flight control unit 14 can be configured to consider one or more flight restrictions and adapt the flight path of the UAV in order to avoid the violation of any possible restrictions. To this end, UAV flight control unit 14 can be configured, after determining the new position of the UAV, to consider available restrictions related data (being indicative of one or more restrictions) and adapt the flight path to the new position in order to avoid the violation of existing restrictions.

In some cases, repositioning of the UAV cannot be accomplished without the violation of a certain restrictions. UAV flight control unit 14 is configured to determine, based on priority data, whether the restriction supersede the repositioning command, or vice versa, and determine whether to execute the command accordingly. In such cases, the operator of control system 110 may be responsible for determining whether the issued repositioning instructions should be executed or not.

The presently disclosed subject matter contemplates a computer program implemented on a non-transitory computer usable medium being readable by a computer for executing the method of the presently disclosed subject matter. The presently disclosed subject matter further contemplates a computer-readable non-transitory computer memory tangibly embodying a program of instructions executable by the computer for executing the method of the presently disclosed subject matter.

The term "non-transitory" is used herein to exclude transitory, propagating signals, but to otherwise include any volatile or non-volatile computer memory technology suitable to the application.

It is to be understood that the presently disclosed subject matter is not limited in its application to the details set forth in the description contained herein or illustrated in the drawings. The presently disclosed subject matter is capable of other embodiments and of being practiced and carried out in various ways. For example, although the description above predominantly pertains to a control system for controlling UAVs, this is done by way of non-limiting example for the sake of simplicity only. The presently disclosed subject matter is not limited to UAVs only, and the teaching disclosed herein with respect to UAVs can be used for controlling other units such as Unmanned Ground Vehicles, Unmanned Marine Vehicles, Unmanned Submarine Vehicles or any other type of remotely controlled vehicle or device (e.g. robots). Terms in the specification and claims (such as ADT), which pertain to the UAV application, are provided as non-limiting examples and should be broadly construed to include any equivalent functional elements which are used in other types of UxVs.

Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

The invention claimed is:

1. A surveillance system, comprising:
an unmanned vehicle (UxV) control unit configured to communicate over a communication link with a UxV; the UxV including a sensing unit configured to capture one or more images of a surveyed area and transmit the images to the UxV control unit; the UxV control unit is configured to display the one or more images on a display device;
wherein the UxV control unit is further configured, responsive to received data indicative of a selected object in the one or more images, to assign a graphical control icon to the selected object; the graphical control icon being a three-dimensional (3D) representation of the selected object, wherein different areas of the selected object are assigned to different respective areas of the graphical control icon;
wherein the graphical control icon is capable of being interacted by an operator for changing an orientation and thus exposing, towards the operator, areas of the control icon that represent areas of the selected object that are not exposed in the one or more images and thereby enable the operator to provide instructions with respect to the areas not exposed in the one or more images;
wherein the surveillance system is configured, responsive to interaction of an operator with the control icon for indicating desired viewing angles of the selected object, to:
determine whether viewing the selected object in the desired viewing angles requires repositioning of the UxV and if so, to generate instructions for repositioning the UxV to enable the sensing unit to view the object at the desired viewing angles.

2. The system according to claim 1, further comprising an onboard control unit mountable onboard the UxV and configured to perform said determining whether viewing the selected object at the desired viewing angles requires repositioning of the UxV, and said generating of instructions for repositioning the UxV.

3. The system according to claim 1, wherein the UxV control unit is configured to perform said determining whether viewing the selected object at the desired viewing angles requires repositioning of the UxV.

4. The system according to claim 1, wherein the UxV control unit is configured, responsive to received data indicative of a selected object in the one or more images, to display the graphical control icon over the selected object in the one or more images.

5. The system according claim 1, wherein the UxV control unit is configured, responsive to received data indicative of a selected object in the one or more images, to display the graphical control icon outside the one or more images.

6. The system according to claim 1, wherein the UxV control unit is configured, responsive to received data indicative of a selected object in the one or more images, to generate the graphical control icon according to a shape and size of the selected object.

7. The system according to claim 1, wherein the graphical control icon is a selectable and resizable icon that can be adapted to a shape and size of the selected object.

8. The system according to claim 1, wherein the UxV control unit includes a drawing tool configured for enabling the operator to draw the graphical control icon assigned to the selected object.

9. The system according to claim 1, wherein: the one or more images are a succession of images in a video streaming; the surveillance system is further configured to trace graphical control icons from an earlier image to a later image along the succession of images, thereby maintaining each graphical control icon associated with an assigned object thereof along the succession of images in the video stream.

10. The system according to claim 1, further comprising the UxV, wherein the UxV includes an unmanned aerial vehicle.

11. A computerized method of controlling an unmanned vehicle (UxV) in a surveillance system; the surveillance system including a UxV control unit configured to communicate over a communication link with the UxV; the UxV including a sensing unit configured to capture one or more images of a surveyed area and transmit the images to the UxV control unit; the UxV control unit is configured to display the one or more images on a display device; the computerized method comprising using one or more processors for:

responsive to data received at the control system, indicative of a selected object in the one or more images, assigning a graphical control icon to the selected object; the graphical control icon being a three-dimensional (3D) representation of the selected object, wherein different areas of the selected object are assigned to different respective areas of the graphical control icon;

wherein the graphical control icon is capable of being interacted by an operator for changing an orientation thereof and thus exposing, towards the operator, areas of the control icon that represent areas of the selected object that are not exposed in the one or more images and enabling the operator to provide instructions with respect to the areas not exposed in the one or more images;

responsive to received interaction with the control icon that indicate desired viewing angles of the selected object, determining whether viewing the selected object at the desired viewing angles requires repositioning of the UxV: and if so, generating instructions for repositioning the UxV to enable the sensing unit to view the object at the desired viewing angles.

12. The computerized method according to claim 11 wherein the determining whether viewing the selected object at the desired viewing angles requires repositioning of the UxV and the generating of instructions is performed by a control unit mountable on the UxV.

13. The computerized method according to claim 11 wherein the determining whether viewing the selected object at the desired viewing angles requires repositioning of the UxV, is performed by the UxV control unit.

14. The computerized method according to claim 11, further comprising responsive to received data indicative of a selected object in the one or more images, displaying the graphical control icon over the selected object in the one or more images.

15. The computerized method according to claim 11, further comprising responsive to received data indicative of a selected object in the one or more images, displaying the graphical control icon outside the one or more images.

16. The computerized method according claim 11, further comprising responsive to received data indicative of a selected object in the one or more images, generating the graphical control icon according to the shape and size of the selected object.

17. The computerized method according to claim 11, wherein the graphical control icon is a selectable and resizable icon that can be adapted to a shape and size of the selected object.

18. The computerized method according to claim 11, wherein the one or more images are a succession of images in a video streaming, the method further comprising: tracing graphical control icons from an earlier image to a later image along the succession of images, thereby maintaining each graphical control icon associated with an assigned object thereof along the succession of images in the video stream.

19. A computer-readable non-transitory memory device tangibly embodying a program of instructions executable by a computer operatively connectable to a surveillance system for executing a method of controlling a UxV; the surveillance system including a UxV control unit configured to communicate over a communication link with the UxV; the UxV including a sensing unit configured to capture one or more images of a surveyed area and transmit the images to the UxV control unit; the UxV control unit is configured to display the one or more images on a display device;

the program of instructions is configured for causing the computer to:

responsive to data received at the control system, indicative of a selected object in the one or more images, assign a graphical control icon to the selected object; the graphical control icon being a 3D representation of the selected object, wherein different areas of the selected object are assigned to different respective areas of the graphical control icon;

the graphical control icon is capable of being interacted by the operator for changing its orientation and thus exposing, towards the operator, areas of the control icon which represent areas of the selected object that are not exposed in the one or more images and which thereby enable the operator to provide instructions with respect to the areas not exposed in the one or more images;

responsive to interaction with the control icon that indicate desired viewing angles of the selected object, determine whether viewing the selected object at the desired viewing angles requires repositioning of the UxV and if so, generating instructions for repositioning the UxV to enable the sensing unit to view the object at the desired viewing angles.

* * * * *